United States Patent Office 2,702,749
Patented Feb. 22, 1955

2,702,749
METHODS OF FINING GLASS AND COMPOSITIONS THEREFOR

Harold C. Hafner, Webster, Gordon F. Brewster, Williamson, and Robert A. Weidel, Rochester, N. Y., assignors to Bausch & Lomb Optical Company, Rochester, N. Y., a corporation of New York No Drawing. Application March 16, 1951,
Serial No. 216,092

20 Claims. (Cl. 106—53)

The specification which follows relates to an improved method of fining glass and compositions therefor.

In the manufacture of optical glass, particularly the so called barium crown glass, the melt in its final stage is subjected to fining for the purpose of removing the minute bubbles of gas resulting from the fusion of the ingredients of the batch. The removal of such bubbles can be effected by holding the glass melt at a relatively high temperature and consequent low viscosity to accelerate the the formation of larger bubbles from the small individual bubbles, and to facilitate the rise of the large bubbles through the melt. Agitation, such as stirring, is also helpful to remove the bubbles. Finally, it is well known that the gas to be removed, generally carbon dioxide, may be released more readily if accompanied by other gas, such as oxygen or nitrogen.

The last mentioned method is usually accomplished by the addition of a chemical capable of releasing the extra gas such as oxygen at high temperature and absorbing it in the presence of alkali at a low temperature. Arsenic trioxide is an example of such an agent.

At low temperature, oxygen may also be made available from agents such as potassium nitrate. Optical glass commonly carries variable quantities of bubbles characteristic of the process used, the composition of the batch, and the conditions under which the melt is carried out.

Barium glasses are known to be very prone to resist complete fining. One reason is believed to be the tendency of such glasses to release gases on cooling from the maximum fining temperature while being prepared for and during casting, or other manufacturing procedure.

When glasses, and especially barium glasses, are melted in platinum crucibles, their quality is generally improved. However, because the addition of a nitrate gives unfavorable reaction or reaction products with platinum, nitrates are not generally applied as aids to fining of such glasses. This objection is found even to the addition at high temperature of oxides, such as arsenic trioxides and pentoxide.

We have found that the removal of bubbles can be considerably improved when the aids above described are replaced by adding to the melt or the batch from which it is made, a small amount, as little as one one-thousandth of one per cent, of an agent which prevents wetting at the glass-platinum interface and allows the gas bubbles to collect into large bubbles and rise or escape at the interface.

Iodine and bromine have been found by scientists to prevent molten glass from wetting the surface of a platinum crucible.

By the substitution for the ordinary fining aids of very small quantities of potassium iodide or potassium bromide, a melt is obtained which after fining has about one tenth of the quantity of bubbles usually counted in this type of glass when melted in platinum. When potassium iodide is used, the effective proportion is found to be one one-hundredth of one per cent (0.01%) by weight.

The same result is obtained by from one tenth to one per cent (0.1–1%) by weight of potassium bromide. Other inorganic compounds which release iodine or bromine on heating, act in the same manner.

Barium crowns are a family of optical glasses well known to those expert in the art. They are well described by G. Brewster et al. in "Transactions of the Society of Glass Technology," 1947, pages 153–169, and Figs. 1 and 2 of that article.

Dense barium crowns and extra dense barium crowns possess reciprocal relative dispersions between 62 and 50, and their minimum indices are respectively between 1.54 and 1.60 ($n_D$). See the diagrams in the article referred to. Generally they contain at least 25 mol. per cent of barium. The chemical relation may be qualitatively described by the molar composition in a ternary diagram:

$$SiO_2 - (BaO + ZnO) - (B_2O_3 + Al_2O_3)$$

Since aluminum and zinc oxides are usually confined to amounts below 10 mol. per cent it is found possible to classify barium crowns with respect to the content of $Al_2O_3$ and ZnO.

The oxide contents of the dense barium crowns are found within the following approximate boundaries:

|  | Mol. per cent |
|---|---|
| BaO (+ZnO) | 25–40 |
| $SiO_2$ | 45–60 |
| $B_2O_3$ (+$Al_2O_3$) | 5–25 |

If boric oxide and alumina exceed ten mol. per cent, alumina exceeds 2.5 mol. per cent and may exceed five mol. per cent. If barium oxide and zinc oxide are greater than 30 mol. per cent, zinc oxide exceeds five mol. per cent.

It is known that substitutions of from one to ten per cent of the oxides of the following elements are used to obtain the optical range given above: titanium, zirconium, columbium, lanthanum, tantalum, strontium, calcium, magnesium, cadmium, sodium, potassium, lithium and lead.

These oxides fall into well defined groups. The first group includes sodium, potassium, calcium and lithium, with a sub-group of zinc and titanium. These can generally be referred to as alkali metal and related oxides.

A second group includes the oxides of zirconium, cadmium, strontium, tantalum, columbium and lanthanum. Titanium is also classifiable in this group. Lead oxide is similar to each of the above groups. Oxides selected from these groups can be included in the barium crowns to obtain the desired optical range. Potassium iodide and bromide work well in the presence of any of these, as well as where the batch does not contain them.

As illustrating the practical embodiment of this invention we give the following examples. These examples are given in percentage by weight. In all instances, the glasses are based on the presence of barium oxide and silica. In most instances, boric acid and alumina are present, while lead oxide is present as a substitutent for the latter two in two examples.

The first group of examples carry varying percentages of certain oxides which for purpose of brevity are defined as alkali metal and related oxides.

| Example | 1 | 2 | 3 | 4 | 5 | 6 | 7 | 8 |
|---|---|---|---|---|---|---|---|---|
| BaO | 19.49 | 29.89 | 42.49 | 48.99 | 49.59 | 49.69 | 46.69 | 16.0 |
| $SiO_2$ | 59.5 | 48.1 | 37.5 | 31.0 | 30.8 | 30.0 | 33.3 | 45.3 |
| $B_2O_3$ | 3.0 | 3.7 | 15.0 | 12.0 | 17.9 | 15.0 | 11.6 | ---- |
| $Al_2O_3$ | ---- | 1.0 | 5.0 | 8.0 | 1.4 | 1.0 | 8.4 | ---- |
| PbO | ---- | ---- | ---- | ---- | ---- | ---- | ---- | 22.59 |
| ZnO | 5.0 | 8.8 | ---- | ---- | ---- | 1.8 | ---- | 8.3 |
| CaO | ---- | ---- | ---- | ---- | ---- | 1.0 | ---- | ---- |
| $K_2O$ | 10.0 | 1.5 | ---- | ---- | ---- | ---- | ---- | 7.8 |
| $Na_2O$ | 3.0 | 1.0 | ---- | ---- | 0.3 | ---- | ---- | ---- |
| $Li_2O$ | ---- | 6.0 | ---- | ---- | ---- | ---- | ---- | ---- |
| $TiO_2$ | ---- | ---- | ---- | ---- | ---- | 1.5 | ---- | ---- |
| KI | 0.01 | 0.01 | 0.01 | 0.01 | 0.01 | 0.01 | 0.01 | 0.01 |

As stated above, potassium bromide is effective in place of potassium iodide, the proportions of the bromide being greater than of the iodide. In this case the above formulas are therefore adjusted as follows:

| Example | 1a | 2a | 3a | 4a | 5a | 6a | 7a | 8a |
|---|---|---|---|---|---|---|---|---|
| BaO | 19.5 | 29.8 | 42.5 | 49.0 | 49.6 | 49.7 | 46.7 | 16.0 |
| SiO₂ | 59.4 | 48.1 | 37.4 | 30.9 | 30.7 | 29.9 | 33.2 | 45.2 |
| B₂O₃ | 3.0 | 3.7 | 15.0 | 12.0 | 17.9 | 15.0 | 11.6 | |
| Al₂O₃ | | 1.0 | 5.0 | 8.0 | 1.4 | 1.0 | 8.4 | |
| PbO | | | | | | | | 22.6 |
| ZnO | 5.0 | 8.8 | | | | 1.8 | | 8.3 |
| CaO | | | | | | 1.0 | | |
| K₂O | 10.0 | 1.5 | | | | | | 7.8 |
| Na₂O | 3.0 | 1.0 | | | 0.3 | | | |
| Li₂O | | 6.0 | | | | | | |
| TiO₂ | | | | | | | 1.5 | |
| KBr | 0.1 | 0.1 | 0.1 | 0.1 | 0.1 | 0.1 | 0.1 | 0.1 |

Many dense barium crowns replace the above mentioned alkali metal and related oxides with oxides of zirconium, lanthanum, cadmium, strontium, tantalum, columbium and titanium. The following examples give the basic formulas where these ingredients are present:

| Example | 9 | 10 | 11 | 12 |
|---|---|---|---|---|
| BaO | 34.39 | 34.99 | 36.69 | 36.99 |
| SiO₂ | 32.1 | 33.6 | 35.3 | 37.1 |
| B₂O₃ | 6.9 | 7.2 | 7.6 | 7.6 |
| Al₂O₃ | 0.5 | 0.5 | 0.5 | 0.6 |
| ZnO | 1.2 | 1.3 | 1.3 | 1.3 |
| La₂O₃ | 8.1 | 8.4 | 8.9 | 8.9 |
| CdO | 3.2 | 3.3 | 3.5 | 3.5 |
| Li₂O | 3.6 | 3.8 | 4.0 | 4.0 |
| Ta₂O₅ | 10.0 | | | |
| Cb₂O₅ | | 6.9 | | |
| TiO₂ | | | 2.2 | |
| KI | 0.01 | 0.01 | 0.01 | 0.01 |

Here again, the substitution of potassium bromide for potassium iodide requires adjustment of the above formulas as follows:

| Example | 9a | 10a | 11a | 12a |
|---|---|---|---|---|
| BaO | 34.4 | 35.0 | 36.7 | 37.0 |
| SiO₂ | 32.0 | 33.5 | 35.2 | 37.0 |
| B₂O₃ | 6.9 | 7.2 | 7.6 | 7.6 |
| Al₂O₃ | 0.5 | 0.5 | 0.5 | 0.6 |
| ZnO | 1.2 | 1.3 | 1.3 | 1.3 |
| La₂O₃ | 8.1 | 8.4 | 8.9 | 8.9 |
| CdO | 3.2 | 3.3 | 3.5 | 3.5 |
| SrO | 3.6 | 3.8 | 4.0 | 4.0 |
| Ta₂O₅ | 10.0 | | | |
| Cb₂O₅ | | 6.9 | | |
| TiO₂ | | | 2.2 | |
| KBr | 0.1 | 0.1 | 0.1 | 0.1 |

The above illustrations indicate how barium crown glass and dense barium crown glass of well known constituents and proportions can be treated by the addition of a very small quantity not exceeding one percent of an inorganic halide.

The amount of halide present is so small that it affects the barium crown composition less than is done by ordinary errors, impurities and changes due to volatilization, etc.

This modification is effective both when ordinary alkaline metals are present, or when the batches contain the oxides of rarer earth metals. In fact, we have included in our examples instances where the addition can even be made to a barium-silicon-lead glass in which the supplemental oxides are merely those of zinc and potassium (Examples 8 and 8a).

By the substitution of the organic halides, we are enabled to omit other fining agents, such as nitrates, arsenic oxides, and the like.

The improvement found in the practice of the present invention is sufficiently great that the fine bubbles usually observed in optical glass can be reduced to one tenth of the amount normally present.

The above examples illustrate the extent to which the indicated and other variations can be made within the scope of the invention as defined in the following claims.

What we claim is:

1. A batch composition for optical glass consisting essentially of barium oxide, silica, lead oxide, zinc oxide, potassium oxide and a significant amount not exceeding one tenth percent by weight of a salt selected from the group consisting of potassium iodide and potassium bromide which prevents the melt from wetting the crucible.

2. A batch composition for optical glass consisting of approximately from 19 to 50 percent by weight barium oxide, from 30 to 60 per cent silica, from three to 18 per cent boric oxide, from one to nine per cent alumina, from 0.01% to 0.1% by weight of a salt selected from the group consisting of potassium iodide and potassium bromide and the remainder made up of at least one of the oxides of the group consisting of the oxides of zinc, calcium, potassium, sodium, lithium and titanium.

3. A batch composition for optical glass consisting of approximately from 34 to 37 percent by weight of barium oxide, from 32 to 37 per cent silica, seven per cent boric oxide, one half per cent alumina, 1.3 per cent zirconium oxide, eight to nine per cent lanthanum oxide, 3.5 per cent cadmium oxide, four per cent strontium oxide, from 0.01% to 0.1% of a salt selected from the group consisting of potassium iodide and potassium bromide and from zero to eleven per cent of an oxide of the group consisting of tantalum, columbium and titanium.

4. The method of fining optical glass of the dense barium crown type containing from 25 to 40 molar percent of the oxides of barium and zinc; from 45 to 60 molar percent of silica and from five to 25 molar percent of the oxides of boron and aluminum without affecting its color, which comprises adding to the glass batch between one one-hundredth percent and one tenth percent by weight, of a salt selected from the group consisting of potassium iodide and potassium bromide and melting the batch to low viscosity in a platinum crucible.

5. The method of fining optical glass of the dense barium crown type containing from 25 to 40 molar percent of the oxides of barium and zinc; from 45 to 60 molar percent of silica and from five to 25 molar percent of the oxides of boron and aluminum without affecting its color, which comprises adding to the glass batch between one one-hundredth percent and one tenth percent by weight, of potassium iodide and melting the batch to low viscosity in a platinum crucible.

6. The method of fining optical glass of the dense barium crown type containing from 25 to 40 molar percent of the oxides of barium and zinc; from 45 to 60 molar percent of silica and from five to 25 molar percent of the oxides of boron and aluminum without affecting its color, which comprises adding to the glass batch approximately one tenth percent by weight, of potassium bromide and melting the batch to low viscosity in a platinum crucible.

7. The method of fining optical glass of the dense barium crown type containing from 25 to 40 molar percent of the oxides of barium and zinc; from 45 to 60 molar percent of silica and from five to 25 molar percent of the oxides of boron and aluminum without affecting its color, which comprises adding to the glass melt in a platinum crucible, approximately one one-hundredth percent by weight of potassium iodide and heating to low viscosity.

8. The method of fining optical glass of the dense barium crown type containing from 25 to 40 molar percent of the oxides of barium and zinc; from 45 to 60 molar percent of silica and from five to 25 molar percent of the oxides of boron and aluminum without affecting its color, which comprises adding to the glass melt in a platinum crucible, approximately one tenth percent by weight of potassium bromide and heating to low viscosity.

9. A batch composition for a color-free optical glass of the dense barium crown type containing from 25 to 40 molar percent of the oxides of barium and zinc; from 45 to 60 molar percent of silica and from five to 25 molar percent of the oxides of boron and aluminum and free from crucible-wetting tendency, containing from one one-hundredth percent to one tenth percent by weight of a salt selected from the group consisting of potassium iodide and potassium bromide.

10. A batch composition for a color-free glass of the dense barium crown type containing from 25 to 40 molar percent of the oxides of barium and zinc; from 45 to 60 molar percent of silica and from five to 25 molar percent of the oxides of boron and aluminum and free from crucible-wetting tendency, containing approximately one one-hundredth percent by weight of potassium iodide.

11. A batch composition for a color-free glass of the dense barium crown type containing from 25 to 40 molar percent of the oxides of barium and zinc; from 45 to 60 molar percent of silica and from five to 25 molar percent of the oxides of boron and aluminum and free from crucible-wetting tendency, containing approximately one tenth percent by weight of potassium bromide.

12. A batch composition for a color-free optical glass free from crucible-wetting tendency, consisting by weight, of from 19 to 50 percent of barium oxide; from 60 to 30 percent of silica; from three to 18 percent of boric oxide; from one to nine percent of alumina; and from one one-hundredth percent to one tenth percent of a salt selected from the group consisting of potassium iodide and potassium bromide.

13. A batch composition for a color-free optical glass free from crucible-wetting tendency, consisting by weight, of from 19 to 50 percent of barium oxide; from 60 to 30 percent of silica; from three to 18 percent of boric oxide; from one to nine percent of alumina; and from one one-hundredth percent to one tenth percent of potassium iodide.

14. A batch composition for a color-free optical glass free from crucible-wetting tendency, consisting by weight, of from 19 to 50 percent of barium oxide; from 60 to 30 percent of silica; from three to 18 percent of boric oxide; from one to nine percent of alumina; and from one tenth percent to one percent of potassium bromide.

15. A batch composition for a color-free optical glass free from crucible-wetting tendency, consisting by weight, of from 34 to 37 percent barium oxide; from 32 to 37 percent silica; from seven to eight percent of boric oxide; from eight to nine percent of lanthanum oxide; and from one one-hundredth percent to one tenth percent of a salt selected from the group consisting of potassium iodide and potassium bromide.

16. A batch composition for a color-free optical glass free from crucible-wetting tendency, consisting by weight, of from 34 to 37 percent barium oxide; from 32 to 37 percent silica; from seven to eight percent of boric oxide; from eight to nine percent of lanthanum oxide; and approximately one one-hundredth percent of potassium iodide.

17. A batch compoistion for a color-free optical glass free from crucible-wetting tendency, consisting by weight, of from 34 to 37 percent barium oxide; from 32 to 37 percent silica; from seven to eight percent of boric oxide; from eight to nine percent of lanthanum oxide and approximately one tenth percent of potassium bromide.

18. A batch composition for a color-free optical glass free from crucible-wetting tendency, consisting by weight, of from 34 to 37 percent barium oxide; from 32 to 37 percent silica; from seven to eight percent of boric oxide; approximately 3.5 percent of cadmium oxide; approximately four percent of lithium oxide; and an oxide selected from the group consisting of tantalum oxide, ten percent; columbium oxide, seven percent, and titanium oxide, two percent; and a salt selected from the group consisting of potassium iodide approximately one one-hundredth percent and potassium bromide approximately one tenth percent.

19. A batch composition for a color-free optical glass free from crucible-wetting tendency, consisting essentially by weight, of from 19 to 50 percent of barium oxide; from 60 to 30 percent of silica; from three to 18 percent of boric oxide; from one to nine percent of alumina; from three-tenths percent to ten percent of an oxide selected from the group consisting of potassium and sodium, and approximately one one-hundredth percent of potassium iodide.

20. A batch composition for a color-free optical glass free from crucible-wetting tendency, consisting essentially by weight, of from 19 to 50 percent of barium oxide; from 60 to 30 percent of silica; from three to 18 percent of boric oxide; from one to nine percent of alumina; from three-tenths percent to ten percent of an oxide selected from the group consisting of potassium and sodium, and approximately one tenth percent of potassium bromide.

References Cited in the file of this patent

UNITED STATES PATENTS

| | | |
|---|---|---|
| 1,572,625 | Taylor | Feb. 9, 1926 |
| 2,009,763 | Dalton | July 30, 1935 |
| 2,009,764 | Dalton | July 30, 1935 |
| 2,359,789 | Pincus | Oct. 10, 1944 |
| 2,397,195 | Mook et al. | Mar. 26, 1946 |
| 2,407,874 | Fraser | Sept. 17, 1946 |
| 2,409,412 | Armistead | Oct. 15, 1946 |
| 2,433,882 | Armistead | Jan. 6, 1948 |

OTHER REFERENCES

Ser. No. 395,364, Berger et al. (A. P. C.) published May 11, 1943.